United States Patent
Buckl et al.

[11] Patent Number: 5,917,069
[45] Date of Patent: Jun. 29, 1999

[54] ADSORBENT FOR TREATMENT OF OILS AND/OR FATS

[75] Inventors: Wolfgang Buckl, Hörgertshausen; Hermann Ebert, Landshut; Helmut Eicke, Moosburg; Norbert Schall, Langenpreising; Werner Zschau, Steinebach; Reinhard Hähn, Vilsheim, all of Germany

[73] Assignee: Sud-Chemie AG, Munich, Germany

[21] Appl. No.: 08/894,385

[22] PCT Filed: Feb. 17, 1996

[86] PCT No.: PCT/EP96/00672

§ 371 Date: Aug. 15, 1997

§ 102(e) Date: Aug. 15, 1997

[87] PCT Pub. No.: WO96/26005

PCT Pub. Date: Aug. 29, 1996

[30] Foreign Application Priority Data

Feb. 18, 1995 [DE] Germany .............. 195 05 579

[51] Int. Cl.$^6$ ............................................. C11B 3/10
[52] U.S. Cl. .................... 554/193; 554/191; 502/63; 502/81; 502/238; 502/407; 423/112
[58] Field of Search .................... 554/191, 193; 502/63, 81, 238, 407; 423/112

[56] References Cited

U.S. PATENT DOCUMENTS

| | | |
|---|---|---|
| 3,725,528 | 4/1973 | Banin . |
| 3,755,183 | 8/1973 | Fahn et al. . |
| 3,902,886 | 9/1975 | Banin . |
| 4,812,436 | 3/1989 | Staal et al. . |
| 5,079,208 | 1/1992 | Lammers et al. . |
| 5,369,069 | 11/1994 | Suzuki et al. . |
| 5,486,499 | 1/1996 | Davies et al. . |

FOREIGN PATENT DOCUMENTS

| | | |
|---|---|---|
| 2103330 | 7/1972 | France . |
| 92/19533 | 12/1992 | WIPO . |

OTHER PUBLICATIONS

Ullmans Encyclopedia of Technical Chemistry Verlag Chemie, Weinheim, 4.Aufl., Bd. 23, 1977.

Primary Examiner—Gary Geist
Assistant Examiner—Deborah D. Carr
Attorney, Agent, or Firm—Scott R. Cox

[57] ABSTRACT

An adsorbent is described based on an inorganic support material with exchangeable mono- and divalent cations, characterized by the fact that the specific surface of the support material is >100 m$^2$/g, its cation exchange capacity is >30 mg-equiv/100 g, its pore volume is >0.15 m/g, the pH value of an aqueous suspension of 8 g of support material in 100 mL of H$_2$O is <7.5 and that at least 60, preferably at least 70% of the exchangeable mono- and/or divalent cations are exchanged by cations acting as Lewis acids, preferably Al$^{3+}$ cations.

18 Claims, No Drawings

ADSORBENT FOR TREATMENT OF OILS AND/OR FATS

TITLE OF THE INVENTION

This application is a 371 of PCT/EP96/00672 filed Feb. 17, 1996.

CROSS-REFERENCES TO RELATED APPLICATIONS Not Applicable

BACKGROUND OF THE INVENTION

1. Field of the Invention

The invention concerns an adsorbent that is particularly suited for treatment of mineral, vegetable and/or animal oils and/or fats, especially for removal of coloring matter.

Adsorbents with exchangeable cations are already known for this purpose and belong to three groups in particular:

2. Description of the Related Art

1. Naturally Active Bleaching Clays

So-called fuller's earths have been used since the mid-19th century for purification of vegetable oils, animal fats and mineral oils. These include bentonites (especially Ca bentonites) of preferably acid origin, but also natural mixtures of palygorskite and smectite also preferably of acid origin. These naturally active clays are generally only dried and ground. Relative to their bleaching activity in vegetable and mineral oils there is therefore considerable dependence on natural properties. These clays are modified if necessary with limited amounts of acid so that the adsorption effect can be optimized within limits (EP-A-0 398 636).

2. Acid-Activated Bentonites

Acid-activated bentonites that proved to be superior in action to natural fuller's earths have been on the market since about 1908 (O. Eckart, Die Bieicherde, page 9 (1929), Verlag Serger & Hepel, Braunschweig). Acid-activated bentonites (bleaching clays) are produced by therefore treating bentonite suspensions with hot mineral acids (for example $H_2SO_4$, HCl).

The main mineral montmorillonite of the bentonite raw material is a natural, swellable layered silicate constructed of silicate lamellae stacked one on the other. Each lamella consists of two ($SiO_4$) tetrahedral layers, between which an ($Al(OH)_4O_2$) octahedral layered is situated. Montmorillonite is a so-called dioctahedral layer silicate, i.e., only two of the three possible octahedral gaps is occupied by aluminum ions. The Al ions in the octahedral gaps can be isomorphically replaced by divalent cations, like Mg ions. Replacement of the trivalent Al ion with the divalent Mg ion leads to a negative excess charge in the crystal. This negative excess charge is equalized between the silicate lamellae by cations, like $Na^+$, $Mg^{2+}$, $Ca^{2+}$, so that electrical neutrality overall exists. The cations situated between the layers are exchangeable by other cations, for which reason bentonites are cation exchangers.

During acid activation acid attack occurs in the octahedral layer of the silicate lamella. The cations situated in the octahedral layer, like $Al^{3+}$, $Mg^{2+}$ and $Fe^{3+}$, are dissolved The exchangeable cations after acid activation essentially consist of $Al^{3+}$ ions (20 to 50% of the ion exchange capacity (IEC)), $Mg^{2+}$ and $Ca^{2+}$ ion (about 30%) and $Fe^{3+}$ ions (about 10%). Between 10 and 20% of the exchangeable cations are present as $H_3O^+$, which was inserted by acid treatment. According to the type of acid treatment the ratio of exchangeable cations can be varied somewhat, but it is not possible to raise the amount of exchangeable $Al^{3+}$ (expressed in % of the total IEC) significantly above 50%.

After acid activation a core that still exhibits the montmorillonite structure remains, which is enclosed by a layer of amorphous silicic acid (formerly the tetrahedral layer of the montmorillonite structure) (cf. Ullmann's Encyclopadie dertechnishen Chemie, Vol. 23, page 322 (1983)).

By acid attack the cation exchange capacity of bentonite is reduced, depending on its origin, from 50 to 120 meq/100 g of bentonite as a function of the intensity of acid attack to about 20 to 80, especially 30 to 50 meq/100 g, for which the remaining montmorillonite core is responsible. $Ca^{2+}$, $Mg^{2+}$, $Al^{3+}$ and $Fe^{3+}$ ions are preferably situated between the layers as exchangeable cations. Each employed crude clay exhibits an optimum with respect to bleaching activity in vegetable oil relative to the remaining cation exchange capacity after acid treatment. The specific surface area, depending on the crude clay, initially rises with increasing acid activation from about 40 to 90 $m^2/g$ to about 180 to 400 $m^2/g$, but diminishes again with continuing acid attack, because the formed amorphous silicic acid is crosslinked to chain and ring structures. The specific surface area is also decisive for the action of bleaching clays in vegetable oils and exhibits an optimum that is influenced by the intensity of acid attack.

The pore volume of crude bentonite is also significantly altered by acid attack. Crude bentonites have a pore volume of less than 0.1 ml/g, distributed in pores with a diameter from 0 to 80 nm. Crude bentonites that already exhibit natural bleaching activity have pore volumes between 0.15 and 0.3 ml/g. With increasing acid attack the pore volume is increased primarily in the favor of smaller pores up to a diameter of 14 nm. Increasing bleaching activity in vegetable oils can also be achieved in this range. With continuing acid activation the percentage of larger pores (>25 nm pore diameter) is increased at the expense of smaller pores. At the same time a reduction in bleaching activity is observed. The degree of acid activation therefore also has an effect via the pore volume on the bleaching activity of an adsorbent.

The conclusion is therefore reached for production of acid-activated bleaching clays that good bleaching activity in vegetable oils is only obtained when acid attack is run far enough that optimum ion exchange capacity, specific surface area and pore volume are produced in the product.

The presence of $H^+$ ions and $Al^{3+}$ ions is one of the essential criteria for evaluating a good bleaching clay. These ions are exchanged during treatment with acid between the layers. This occurs in a manner so that $Al^{3+}$ is initially dissolved out with the acid from the montmorillonite crystal to then be exchanged partially between the layers via cation exchange reaction. Exchange of $H_3O^+$ ions occurs directly during acid treatment.

There is a need to further increase the effectiveness of bleaching clays in vegetable oils in order to permit more limited use amounts in oil.

3. Synthetic Bleaching Clays

EP-A-0 269 173 describes production of synthetic, heat-regenerable bleaching agents and their use for bleaching vegetable oils. A hydrogel is produced from Na silicate and $H_2SO_4$ to which an $Al_2(SO_4)_3$ solution is added during crystallization. The product is dried and calcined. The high ion exchange capacity (IEC) of the product is 43 meq/100 g, in which 32% pertains to $Na^+$ ions, 65% to $Al^{3+}$ ions and 4% to $Ca^{2+}$ ions. An increase in the percentage of $Al^{3+}$ ions by controlling synthesis is not possible. The bleaching activity of the product is acceptable in linseed oil and soybean oil, but the bleaching agent is not suitable for treatment of palm oil.

Metal silicates are described in DE-A-2 036 819 as synthetic bleaching agents. For example, an Al silicate is produced by heating $Al_2(SO_4)_3$ with water glass. The products of precipitation, which consist primarily of metal hydroxides, are converted by drying to metal oxides that are then ground. The composition is set within narrow limits by the precipitation process; an ion exchange after synthesis is not described. The bleaching agent exhibits acceptable bleaching activity in linseed oil and soybean oil, but not in palm oil.

The most important clays and clay minerals for production of bleaching earths, as well as the properties of bleaching earths and their use for refining of oils, are described in Ullmann's Encyclopadie der technischen Chemie, Vol. 23 (1977). General comments are made concerning the ion exchange capacity of bleaching clays; no assertions are made concerning composition, let alone the effect of different intermediate layer cations. No mention of incorporation of trivalent ions in particular can be found.

The underlying task of the invention is to improve the bleaching action of natural bleaching clays, acid-activated smectites and synthetic bleaching clays, especially in terms of bleaching of palm oil.

It was surprisingly found that the bleaching activity of these substances, to which ion exchange capacity is common, can be improved if cations that act as Lewis acids, especially $Al^{3+}$ ions, are exchanged in the exchangeable sites. Moreover, the following can be exchanged as cations that act as Lewis acids: $Zr^{3+/4+}$, $Sn^{2+/4+}$, $Zn^{2+}$, $Ti^{3+/4+}$, $Co^{2+}$, $Ni^{2+}$, $Fe^{3+}$, $Cr^{3+}B^{3+}Mn^{2+/3+/4+}$.

BRIEF SUMMARY OF THE INVENTION

The object of the invention is therefore an adsorbent based on an inorganic support material with exchangeable mono- and divalent cations, characterized by the fact that the specific surface area of the support material is>100 $m^2/g$, its cation exchange capacity is>30 meq/100 g, its pore volume is>0.15 ml/g, the pH value of an aqueous suspension of 8 g of support material in 100 ml of $H_2O$ is less than 7.5 and that at least 60, preferably at least 70% of the exchangeable mono- and/or divalent cations are exchanged by cations that act as Lewis acids, especially $Al^{3+}$ cations.

DETAILED DESCRIPTION OF THE INVENTION

The following, among others, can be used as support materials for the adsorbents according to the invention:

1. Naturally active clays based on smectite with a specific surface area of>100 $m^2/g$, a cation exchange capacity >30 meq/100 g, a pore volume (d=0–80 nm)>0.15 ml/g, and a pH value of an aqueous suspension of 8 g of support material in 100 ml $H_2O$ which is<7.5.
2. Acid-activated clay minerals based on smectite with a specific surface area of>200 $m^2/g$, a cation exchange capacity>30 to 50 mg-equiv/100 g, a pore volume (d=0–80 nm)>0.25 ml/g, and a pH value of an aqueous suspension of 8 g of support material in 100 mL of $H_2O$ from about 2 to 6.
3. Synthetic bleaching clays based on an aluminum silicate that can be produced, for example, according to the following methods:
   a) Reaction of an aluminum salt with water glass (Na silicate) at boiling heat; or
   b) Production of a hydrogel from Na silicate and sulfuric acid, in which an aluminum salt is added to the hydrogel.

The aluminum silicate has a specific surface area of>300 $m^2/g$, preferably 300 to 600 $m^2/g$, a cation exchange capacity of about 30 to 60 meq/100 g, a pore volume>0.2 mL/g, and a pH value of an aqueous suspension of 8 g of support material in 100 ml $H_2O$ from 3 to 6.

Another object of the invention is a process for production of the adsorbent just described, characterized by the fact that the support material is treated with the solution of a salt with a cation acting as Lewis acid (for simplicity referred to as "Lewis acid cation" below), in which the molar excess of Lewis acid cation is at least twice the cation exchange capacity of the support material, whereupon the excess salt solution is eliminated, the residue washed, dried and optionally calcined.

The process is preferably run so that the residue loaded with the Lewis acid cations is washed until the content of free cations in the wash water is<100 mg.

Exchange of the Lewis acid cations is generally carried out by dispersing of the starting materials in water and using of Lewis acid salts in excess. After sufficient contact time, preferably at elevated temperature, it is filtered and washed. The obtained adsorbent is then dried, ground and optionally (especially in synthetic bleaching clays) calcined. The adsorbents so treated exhibit 60 to 90%, preferably 70 to 90% of the of the total ion exchange capacity in the form of exchangeable Lewis acid cations, especially $Al^{3+}$ ions, optionally combined with other cations from the aforementioned group.

A significant improvement in bleaching activity of the adsorbent in vegetable oils, especially in linseed oil and palm oil, is established by this treatment, which under practical conditions means that the adsorbent can be used in lower amounts. The Lewis acidity increased by exchange of Lewis acid cations appears to play an important role in oil bleaching.

However, a prerequisite is that adhering, excess salts are eliminated by intense washing so that the pores of the adsorption agent are not clogged.

Ion exchange in the synthetic bleaching clays occurs after synthesis of the aluminum silicate by redispersal in a salt solution with Lewis acid cations with a cation excess over a period from 15 minutes to 8 hours, preferably over a period from 20 minutes to 2 hours, at a temperature from about 20 to 95° C., preferably from 40 to 80° C. After exchange of the Lewis acid cations the product is generally filtered, redispersed in $H_2O$, filtered again and washed with $H_2O$. The washed product is dried, preferably by spray drying, and optionally calcined at about 600 to 850° C. The calcined product is generally ground.

Another object of the invention is the use of the adsorbent according to the invention for treatment of vegetable or animal oils and/or fats or mineral oils.

The defining features stated in the claims are determined as follows:

1. Specific surface area: According to the BET method (single-point method with nitrogen according to DIN 66 131; preliminary degassing at 110° C. over 2 hours).
2. Ion exchange capacity (IEC): 2 g of the support material dried at 100° C. is boiled under reflux with 100 ml of a 2N $NH_4Cl$ solution for 1 hour. After 16 hours of standing the sample is filtered off and washed with about 800 ml distilled water until $NH_4$ ions can no longer be detected with Nessler's reagent in the last washing water.

The washed sample is dried for an hour at 110° C., ground, dried again for an hour at 110° C., whereupon it is dissolved in sulfuric acid and the NH4 content determined according to Kjeldahl. The IEC (meq/100 g of sample) corresponds to the $NH_4$ ion equivalent.

The total IEC, as well as the percentage of exchangeable cations in the total IEC of the absorbent, is determined in the same fashion.

According to this method only the cations from the intermediate lattice positions are exchanged. The cations bonded in the layer lamellae ($Al^{3+}$, $Fe^{3+}$, $Mg^{2+}$) do not go into solution.

3. Pore volume: The micropore volume (of pores with a diameter d=0 to 80 nm) of the adsorbent or carrier material is determined by allowing carbon tetrachloride vapor to act on the substances and determining the weight increase from carbon tetrachloride adsorption. In order to determine pores with a specified diameter the vapor pressure of the carbon tetrachloride is reduced by addition of a specified amount of paraffin to the liquid carbon tetrachloride. In particular, the determination is run so that a sample of 1 to 2 g is dried in a weighing glass at 130° C. in a drying box. The weighing glass with the accurately weighed sample is placed in a vacuum desiccator that contains a mixture of 25 ml paraffin and 184 ml carbon tetrachloride to determine the pores from 0 to 80 nm. The desiccator connected to a graduated cooling trap, manometer and vacuum is evacuated to boiling of the contents. 10 ml of carbon tetrachloride is evaporated and precipitated in the cooling trap. The desiccator contents are then allowed to equilibrate for 16 hours at room temperature, whereupon air is slowly admitted into the desiccator. The weighing glass is immediately closed and reweighed.

The values are calculated in mg $CCl_4$ adsorption per g of substance. By dividing by the density of carbon tetrachloride (d=1.595 g/cm$^3$ at 20° C.) the pore volume is obtained in ml/g of substance:

Weight increase/(Weighed amount×Density $CCl_4$)

4. pH value: The stated method is described in H. A. Benesi, R. U. Bonnar et al., Analytical Chemistry, December 1955, Vol. 27, page 1963.

8 g of support material is dispersed in 100 ml deionized water. After brief boiling it is cooled to room temperature. The pH value of the cooled suspension is measured with a pH electrode.

The invention is explained with the following examples.

EXAMPLE 1

A naturally active bentonite crude clay with the following properties was used:

| IEC (meq/100 g) | 39 |
|---|---|
| specific surface area (m²/g) | 150 |
| pore volume (0–80 nm, ml/g) | 0.3 |
| pH value | 5.3 |

The equivalents of the exchangeable cations, as well as the total IEC, are shown in Table 1 (under 1b).

100 g crude clay (referred to dry substance) was dispersed in 500 ml water. 20 g $Al_2(SO_4)_3 \cdot 18H_2O$ (12-fold molar excess referred to total IEC) was then added. The pH value was adjusted with 2N $H_2SO_4$ to pH 2. The suspension was agitated at 50° C. for 1 hour. It was filtered and washed twice with 200 ml $H_2O$ each time (distilled). It was then dried in a drying box and ground (example 1a). The obtained product was compared with dried and ground crude bentonite (example 1b).

The total ion exchange capacity (IEC) and the percentage of exchangeable cations in the IEC were determined. The results are shown in Table 1.

TABLE 1

|  |  | 1a | 1b |
|---|---|---|---|
| IEC (meq/100 g) |  | 39 | 39 |
| Exchangeable | $Na^+$ | <0.5 | 0.6 |
|  | $K^+$ | 0.8 | 1.0 |
|  | $Ca^{2+}$ | 5.1 | 37 |
|  | $Mg^{2+}$ | 3.0 | 14 |
|  | $Al^{3+}$ | 23.7 | 2.6 |
|  | $Fe^{3+}$ | 6.6 | 6.4 |
| Sum of cations: |  | 39.7 | 69.6 |

The sum of the IEC of exchangeable cations in example 1a corresponds within the accuracy of the method to the total IEC. The sum of exchanged Lewis acid cations ($Al^{3+}$ and $Fe^{3+}$) is 30.3 meq/100 g (77% of all exchangeable cations). The sum of the IEC of the exchanged cations in example 1b surpasses the total IEC. This is attributed to the fact that during determination of the IEC (reflux boiling with $NH_4Cl$) accompanying minerals (e.g., $CaCO_3$) are also dissolved, whose cations are additionally recovered with the exchanged cations in the filtrate (most $Ca^{2+}$). This is not the case in example 1a, because the soluble cations are already dissolved during treatment with the acid aluminum sulfate solution and then filtered off. In example 1b the sum of Lewis acid cations ($Al^{3+}$ and $Fe^{3+}$) is 9.0 meq/100 g (23% of all exchangeable cations).

BLEACHING EXPERIMENTS

Bleaching of Linseed Oil 80 g of filtered, crude linseed oil is weighed into a 250 ml glass beaker. After introduction of 2.5% adsorbent it is heated for 30 minutes in a boiling water bath.

It is then filtered through a vacuum suction filter. The oil is finally filtered through a folded filter.

To evaluate the bleaching effect the oil is measured in a photometer (Hitachi U-1000 spectrophotometer) with respect to transmission at 460 nm. The results are shown in Table 2.

TABLE 2

Bleaching effect of linseed oil.

| Example | Transmission (%), 460 nm Cell: 1 cm |
|---|---|
| 1a | 19 |
| 1b | 11 |

Bleaching of Palm Oil 80 g of crude, filtered palm oil (melted at about 50° C.) is placed in a 250 mL three-necked flask. 2.5% bleaching agent is added to the oil. A vacuum of 50 mbar is then created. During agitation it is heated to 100° C. with a mushroom heater. After reaching this temperature it is further agitated for 30 minutes. It is then allowed to cool during agitation to 80° C. under vacuum. It is filtered through a vacuum suction filter and finally filtered through a folded filter.

Brightening of the oil was determined by determining the Lovibond color numbers. A 5¼" cell was used for the measurements. The results are shown in Table 3.

TABLE 3

| Example | Lovibond color number | |
|---|---|---|
| | R (red) | Y (yellow) |
| 1a | 19 | 70 |
| 1b | 22 | 70 |

The adsorbent according to the invention (example 1a) exhibits a better red value than the support material (example 1b).

EXAMPLE 2

100 g of filter cake of an acid-activated bleaching clay with a specific surface of 250 m$^2$/g, an IEC of 31.5 meq/100 g and a pore volume of 0.35 ml/g (filter product-precursor of Tonsil Optimum®, Sud-Chemie AG) is suspended in 500 ml of a 4% $Al_2(SO_4)_3$ solution (12-fold molar excess referred to total IEC). The pH value is set with $H_2SO_4$ at 2. The suspension is agitated for 1 hour at 50° C. and then a) washed twice with 200 mL $H_2O$ (distilled) each time (example 2a), b) not washed (example 2b).

For comparison part of the filter cake was held back (example 2c). The products were dried for 1 hour at 110° C. in a drying box and ground. The equivalents of exchangeable cations and the total IEC were determined.

TABLE 4

Total IEC and exchangeable cations.

| | | Filter cake | | |
|---|---|---|---|---|
| | | 2c | 2a | 2b |
| IEC (meq/100 g) | | 32 | 31.5 | 31.9 |
| Exchangeable | Na$^+$ | 0.76 | <0.5 | <0.5 |
| | K$^+$ | 0.61 | <0.5 | 0.62 |
| | Ca$^{2+}$ | 7.44 | 0.77 | 1.33 |
| | Mg$^{2+}$ | 4.10 | 0.84 | 1.11 |
| | Al$^{3+}$ | 2.59 | 2.58 | 3.15 |
| | Fe$^{3+}$ | 16.74 | 28.55 | 62.06 |
| Sum of cations | | 32.24 | 32.74 | 68.27 |
| pH value | | 3.1 | 3.0 | 2.1 |

The total IEC of all samples is unchanged at about 32 meq/100 g. The percentage of exchangeable Al$^{3+}$ ions in the bleaching clay filter cake (2c) is about 50%. The percentage of exchangeable Ca$^{2+}$ ions is 23%, the percentage of exchangeable Mg$^{2+}$ ions 13% and that of exchangeable Fe$^{3+}$ ions 8%. After ion exchange of Al$^{3+}$ and subsequent washing (2a) the following ions are contained in the stated percentages:

| | |
|---|---|
| Al$^{3+}$ | 89% |
| Fe$^{3+}$ | 8% |
| Mg$^{2+}$ | 2.6% |
| Ca$^{2+}$ | 2.4% |
| | 102% |

The excess of 2% lies within the error limits of the method.

In the sample of example 2b a significant excess of Al$^{3+}$ is found, i.e., excess Al salt adheres to the surface of the bleaching clay and simulates a high Al$^{3+}$ IEC. The Al salt occupies the pores required for bleaching of oils.

The samples from 2a, 2b and 2c are used as follows for oil bleaching:

Linseed oil: see example 1 for details concerning the bleaching procedure.

Crude Palm. Addition of 1.5% bleaching clay. Treatment at T=120° C., t=30 min, p=50 mbar. See example 1 for details concerning bleaching procedure.

Degummed Soybean oil. Addition of 0.5% bleaching clay. Treatment at T=90° C., t=30min p=20 mbar.

Degummed Rapeseed oil. Addition of 0.5% bleaching clay. Treatment at T=110 C., t =30 min, p =20 mbar.

The treated oils were cooled, the reaction vessel ventilated and filtered. The obtained oils were measured in a Lovibond apparatus or on a photometer (linseed oil):

The results are shown in Table 5.

TABLE 5

Bleaching effect.

| Example | | 2c | 2a | 2b |
|---|---|---|---|---|
| Linseed oil bleaching | | | | |
| Transmission (%) (460 nm) | | 44 | 49 | 44 |
| Palm oil bleaching (120° C., 50 mbar, 30 min) | | | | |
| Lovibond | red | 27 | 21 | 26 |
| | yellow | 70 | 63 | 70 |
| Soybean oil bleaching (90° C., 20 mbar, 30 min) | | | | |
| Lovibond | red | 4.3 | 4.1 | 44 |
| | yellow | 70 | 70 | 70 |
| ppm (chlorophyll A) | | 0.16 | 0.16 | 0.15 |
| Rapeseed oil bleaching (110° C., 20 mbar, 30 min) | | | | |
| Lovibond | red | 3.3 | 3.0 | 3.2 |
| | yellow | 70 | 69 | 63 |
| Chlorophyll A ppm | | 0.12 | 0.11 | 0.13 |

Sample 2a was superior in bleaching effect to sample 2c in all oils. This is particularly significant in palm oil and linseed oil. Sample 2b shows no improvement relative to sample 2c. This demonstrates the need for washing after ion exchange, since otherwise the excess Al salt occupies the pores of the bleaching clay and the positive effect of Al$^{3+}$ exchange and the reduction of pore volume relative to the resulting bleaching activity are mutually offset.

EXAMPLE 3

100 g of filter cake of an acid-activated bleaching clay with a specific surface area of 250 m$^2$/g, an IEC of 29 meq/100 g and a pore volume of 0.35 ml/g (filter product-Precursor of Tonsil Optimum®, Sud-Chemie AG) is suspended in 500 ml of a 2.45% $ZnCl_2$ solution (13-fold molar excess).

The pH value is set with $H_2SO_4$ at 2. The suspension is agitated at 50° C. for 1 hour and then a) washed twice with 200 ml $H_2O$ (distilled) each time (example 3a), b) not washed (example 3b).

For comparison part of the filter cake was held back (example 3c). The products were dried for 1 hour at 110° C. in a drying box and ground. The equivalents of exchangeable cations as well as the total IEC were determined.

TABLE 6

Total IEC and exchangeable cation.

| | | Filter cake | | |
|---|---|---|---|---|
| | | 3c | 3a | 3b |
| IEC (meq/100 g) | | 29 | 29 | 29 |
| Exchangeable | $Na^+$ | <0.5 | <0.5 | <0.5 |
| | $K^+$ | 0.6 | 0.6 | 0.6 |
| | $Ca^{2+}$ | 6.8 | 2.8 | 1.6 |
| | $Mg^{2+}$ | 4.3 | 1.6 | 1.3 |
| | $Fe^{3+}$ | 0.9 | 0.9 | 0.9 |
| | $Al^{3+}$ | 12.5 | 12.7 | 12.1 |
| | $Zn^{2+}$ | <0.5 | 8.3 | 34.2 |
| Sum of cations | | <26.1 | <27.4 | <51.2 |
| pH value | | 3.0 | 2.9 | 2.9 |

The samples from 3a, 3b and 3c are used as follows for oil bleaching:

Linseed oil: Cf. example 1 for details concerning bleaching procedure.

Palm oil: Bleaching conditions as in example 2. Cf. example 1 for details concerning bleaching procedure.

Rapeseed oil: Bleaching conditions as in example 2. Cf. example 1 for details concerning bleaching procedure.

The results are shown in Table 7.

TABLE 7

Bleaching effect.

| Example | | 3c | 3a | 3b |
|---|---|---|---|---|
| Linseed oil bleaching | | | | |
| Transmission (%) (460 nm) | | 36 | 40 | 31 |
| Palm oil bleaching (90° C., 20 mbar, 30 min) | | | | |
| Lovibond | red | 18.5 | 17.2 | 21.1 |
| | yellow | 70 | 70 | 63 |
| Rapeseed oil bleaching (110° C., 20 mbar, 30 min) | | | | |
| Lovibond | red | 3.2 | 2.6 | 2.9 |
| | yellow | 70 | 70 | 70 |

Sample 3a is superior in bleaching effect to sample 3c in all oils. Sample 3b shows a deterioration relative to sample 3c in linseed oil and palm oil and an improvement in rapeseed oil, but does not reach that of sample 3a. The decisive effect of the washing process is found here as well.

EXAMPLE 4

According to example 9 from DE-A-2 036 819 a synthetic adsorbent appropriate for bleaching of vegetable oils is produced as follows:

5.6 kg $Al_2(SO_4)_3 \cdot 18H_2O$ is dissolved in 14 l of $H_2O$ (distilled) and heated to boiling under agitation. 2.4 kg of water glass solution (37/40° Be) dissolved in 14 l of $H_2O$ (distilled) is slowly metered in over 30 minutes. It is further agitated under reflux boiling for 4 hours.

The flocculate is filtered and washed. The obtained filter product is divided into two halves: the first half is suspended in about 10 l of $H_2O$ and spray dried (example 4a, comparative example). The second half is suspended in similar fashion to examples 1 and 2 in a 4% $Al_2(SO_4)_3$ solution and heated during agitation to 50° C. for an hour. It is then filtered, washed and spray dried (example 4b, invention example). Both products are then calcined for an hour at 700° C., cooled and ground.

The equivalents of exchangeable cations as well as the total IEC were determined:

TABLE 8

| | 4a | 4b |
|---|---|---|
| IEC (meq/100 g) | 54 | 54 |
| Exchangeable cations | | |
| $Ca^{2+}$ | 2 | 1 |
| $Mg^{2+}$ | 2 | 1 |
| $Al^{3+}$ | 25 | 44 |
| $Na^+$ | 26 | 7 |
| Sum of cations | 55 | 53 |
| pH value | 4.0 | 3.1 |

BLEACHING EXPERIMENTS

Products 4a and 4b are used for bleaching of linseed oil, palm oil and rapeseed oil:

Linseed oil
T=100° C., t=30 min, 2.5% bleaching agent

Palm oil
T=120° C., t=30 min, p=50 mbar, 2.5% bleaching agent

Rapeseed oil
T=110° C., t=30 min, p=20 mbar, 0.5% bleaching agent

Details concerning performance of the experimental bleaching are found in examples 1 to 3.

The results are shown in Table 11.

TABLE 11

| Example | | 4a | 4b |
|---|---|---|---|
| Linseed oil bleaching | | | |
| (%) Transmission (460 nm) | | 47 | 53 |
| Palm oil bleaching | | | |
| Lovibond | red (R) | 40 | 36 |
| | yellow (Y) | 70 | 57 |
| Rapeseed oil bleaching | | | |
| Lovibond | red (R) | 5.3 | 4.3 |
| | yellow (Y) | 70 | 70 |

Comparison between samples 4a and 4b clearly shows the better bleaching properties of the product in which the $Al^{3+}$ ions were exchanged.

We claim:

1. A process for the bleaching of fats and vegetable, animal or mineral oil comprising preparing an adsorbent based on an inorganic support material, wherein the support material has a specific surface area greater than about 100 m²/g, a cation exchange capacity greater than 30 meq/100 g, a pore volume greater than about 0.15 ml/g, and a pH value of an aqueous suspension of 8 grams of the support material in 100 ml of $H_2O$ less than about 7.5, treating the support material with a molar excess of Lewis acid cations wherein the Lewis acid cations contain about twice the cation exchange capacity of the support material, removing excess salt solution from the treated support material to produce a residue, washing and drying the residue, contacting the fat or oil with the washed and dried residue, and separating the residue from the fat or oil.

2. An adsorbent comprising an inorganic support material comprising exchangeable mono- or divalent cations, wherein the support material has a specific surface area greater than about one hundred $m^2/g$, a cation exchange capacity greater than about 30 meq/100 g, and a pore volume greater than about 0.15 ml/g, a pH of an aqueous suspension of 8 g. of the support material in one hundred ml of $H_2O$ less than about 7.5, and wherein at least about 60 percent of the exchangeable mono- or divalent cations are exchanged with cations acting as Lewis acids.

3. The adsorbent of claim 2, wherein at least about 70 percent of the exchangeable mono- or divalent cations are exchanged with cations acting as Lewis acids.

4. The adsorbent of claim 2, wherein the Lewis acid is an $Al^{3+}$ cation.

5. The adsorbent of claim 2, wherein the specific surface area of the material is greater than about 200 $m^2/g$, the cation exchange capacity is about 30 to about 50 meq/100 g, the pore volume is greater than about 0.25 ml/g and the pH of an aqueous suspension of 8 grams of the support material in one hundred ml of water is between about 2 and 6.

6. The adsorbent of claim 2, wherein the support material is a smectite clay.

7. The adsorbent of claim 5, wherein the support material is a smectite clay.

8. The adsorbent of claim 2, wherein the support material is a synthetic bleaching clay based on an aluminum silicate.

9. The adsorbent of claim 2, wherein the synthetic bleaching clay is an aluminum silicate having a specific surface area greater than about 300 $m^2/g$, a cation exchange capacity of about 30 to 60 meq./100 g, pore volume greater than about 0.2 ml/g and a pH of an aqueous suspension of 8 g of support material in 100 ml of water of about 3 to 6.

10. The adsorbent of claim 9, wherein the specific surface area of the synthetic bleaching clay based on aluminum silicate is from about 300 to 600 $m^2/g$.

11. A process for production of an adsorbent based on an inorganic support material with exchangeable mono- or divalent cations comprising treating the support material with a solution of a salt containing a cation acting as a Lewis acid, in which the molar excess of the Lewis acid is at least twice the cation exchange capacity of the support material, removing any excess salt solution from the treated support material to produce a residue, washing the residue, and drying the residue.

12. The process of claim 11, wherein the support material has a specific surface area greater than about 100 $m^2/g$, a cation exchange capacity greater than about 30 meq/100 g, a pore volume greater than about 0.15 ml/g, a pH of an aqueous suspension of 8 grams of the support material in 100 ml of $H_2O$ less than about 7.5 and wherein about 60 percent of the exchangeable mono- or divalent cations of the support material are exchanged with cations acting as Lewis acids.

13. The process of claim 11, further comprising calcining the dried residue.

14. The process of claim 11, wherein the salt is an aluminum salt.

15. The process of claim 11, further comprising washing the residue until the content of free cations in wash water produced during washing is less than about 100 mg/l.

16. The process of claim 12, wherein the Lewis acids are $Al^{3+}$ cations.

17. The process of claim 12, wherein the support material is a naturally active smectite clay.

18. The process of claim 12, wherein the support material is a synthetic bleaching clay based on an aluminum silicate.

* * * * *